US012609007B2

(12) United States Patent
Oda et al.

(10) Patent No.: US 12,609,007 B2
(45) Date of Patent: Apr. 21, 2026

(54) MEDIUM PROCESSING SYSTEM, MEDIUM PROCESSING METHOD, RECORDING MEDIUM

(71) Applicant: GLORY LTD., Hyogo (JP)

(72) Inventors: Takuma Oda, Hyogo (JP); Hitoshi Ueno, Hyogo (JP)

(73) Assignee: GLORY, LTD., Hyogo (JP)

( * ) Notice: Subject to any disclaimer, the term of this patent is extended or adjusted under 35 U.S.C. 154(b) by 30 days.

(21) Appl. No.: 18/603,282

(22) Filed: Mar. 13, 2024

(65) Prior Publication Data

US 2024/0311229 A1 Sep. 19, 2024

(30) Foreign Application Priority Data

Mar. 15, 2023 (JP) ................................ 2023-040775

(51) Int. Cl.
*G07F 19/00* (2006.01)

(52) U.S. Cl.
CPC ................................ *G07F 19/209* (2013.01)

(58) Field of Classification Search
CPC ....... G07F 19/20; G07F 19/206; G07F 19/209
See application file for complete search history.

(56) References Cited

U.S. PATENT DOCUMENTS

2014/0107836 A1* 4/2014 Crews .................. G07F 19/209 700/236
2014/0353375 A1* 12/2014 Turocy ............ G06K 19/07779 235/379
2017/0008717 A1 1/2017 Oguchi
2022/0292500 A1* 9/2022 Ward .................. H04L 9/3265

FOREIGN PATENT DOCUMENTS

JP 2017-021569 A 1/2017

* cited by examiner

*Primary Examiner* — Laura A Gudorf
(74) *Attorney, Agent, or Firm* — Shih IP Law Group, PLLC

(57) ABSTRACT

A medium processing system includes: a memory and a processor, in which the processor performs application execution for exchanging transaction information with a device via middleware to perform information processing on a transaction of a valuable medium, the device being configured to perform the transaction, and error processing of acquiring, upon occurrence of an error in the device during the transaction of the valuable medium, first error information from among pieces of information on the error without the middleware to perform error recovery processing on the error based on the first error information.

14 Claims, 11 Drawing Sheets

| Type of Processing | Transaction Accepted | Transaction Unaccepted |
|---|---|---|
| Deposit processing | Device | User |
| Withdrawal processing | User | Device |

FIG. 9

MEDIUM PROCESSING SYSTEM, MEDIUM PROCESSING METHOD, RECORDING MEDIUM

CROSS REFERENCE TO RELATED APPLICATIONS

This application is entitled and claims the benefit of Japanese Patent Application No. 2023-040775, filed on Mar. 15, 2023, the disclosure of which including the specification, drawings and abstract is incorporated herein by reference in its entirety.

TECHNICAL FIELD

The present disclosure relates to a medium processing system, a medium processing method, and a recording medium.

BACKGROUND ART

Standards called extensions for Financial Services (XFS) have been developed by the European Commission for Standardization to improve the portability of software for the financial sector.

Conventionally, a card transport system conforming to the standards has been disclosed. In this card transport system, an application of a host apparatus controls a card reader device via an XFS manager and a service provider, which are middleware. The XFS standards are also used for banknote processing devices, coin handling devices, and the like.

SUMMARY

A medium processing system according to the present disclosure comprises: a memory and a processor, in which the processor is configured to execute an application for exchanging transaction information with a device via middleware to perform information processing on a transaction of a valuable medium, the device being configured to perform the transaction, and acquire, upon occurrence of an error in the device during the transaction, first error information from among pieces of information on the error without the middleware, and perform error recovery processing on the error based on the first error information.

BRIEF DESCRIPTION OF DRAWINGS

FIG. 9 illustrates a determination rule for determining a return destination;

DESCRIPTION OF EMBODIMENTS

Figure 1:
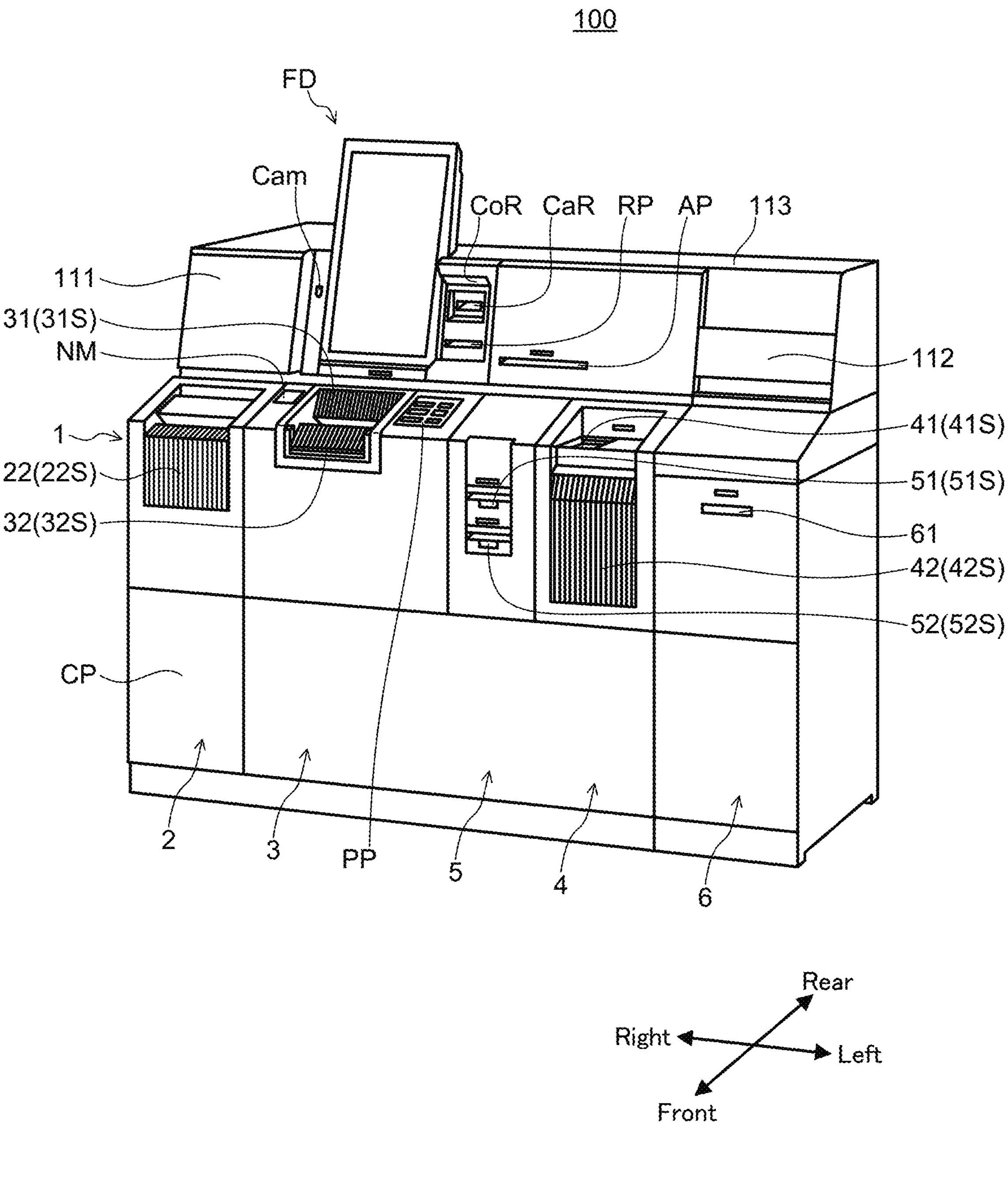
FIG. 1 illustrates an external appearance of a medium processing system according to the present embodiment as seen from the front.

In general, XFS standards lack sufficient commands for error processing of a device. Therefore, it has been difficult to effectively perform error control when an error occurs in the device.

An object of the present disclosure is to provide a medium processing system, a medium processing method, and a medium processing program capable of effectively performing error control when an error occurs in a device.

The medium processing method according to the present disclosure comprises: exchanging transaction information with a device via middleware to perform information processing on a transaction of a valuable medium, the device being configured to perform the transaction; and acquiring, upon occurrence of an error in the device during the transaction of the valuable medium, first error information from among pieces of information on the error without the middleware to perform error recovery processing on the error based on the first error information.

In addition, a recording medium in the present disclosure records thereon a medium processing program for causing a computer to execute: exchanging transaction information with a device via middleware to perform information processing on a transaction of a valuable medium, the device being configured to perform the transaction; and acquiring, upon occurrence of an error in the device during the transaction of the valuable medium, first error information from among pieces of information on the error without the middleware to perform error recovery processing on the error based on the first error information.

Accordingly, even when the middleware does not have a function of handling the first error information, the solution including the medium processing system, the medium processing method, and the recording medium in the present disclosure allows effective error control.

It should be noted that the above solution may be a combination of one or more of the following features within a consistent and reasonable range.

That is, the device may comprise a transport unit that transports the valuable medium. In addition, the device may comprise a recognition unit that recognizes a type of the valuable medium. In addition, the device may comprise a storage unit that stores the valuable medium.

The transaction of the valuable medium may involve transport processing of the valuable medium, and the error recovery processing may comprise a process of determining the return destination of the valuable medium transported.

Thus, even when the middleware does not have the function of handling the first error information, the solution makes it possible to determine the return destination of the valuable medium.

The first error information may comprise information on a position of the valuable medium transported.

The transport unit of the device may be provided with a sensor for detecting the presence or absence of the valuable medium, and the device may generate information on the position of the valuable medium by detecting an output signal of the sensor.

Accordingly, the solution makes it possible to easily detect the position of the valuable medium remaining in the device, and to effectively perform the error recovery processing.

The error recovery processing may comprise a process of outputting, based on the information on the position of the valuable medium, information prompting extraction of the valuable medium from the device.

Thus, the solution can effectively prompt the user or the administrator of the medium processing system to extract the valuable medium from the device.

The first error information may comprise information indicating whether or not the transaction has been accepted.

Accordingly, the solution can easily determine the return destination of the valuable medium depending on whether or not the transaction has been accepted.

The error recovery processing may comprise a process of determining the return destination of the valuable medium based on information on a command executed immediately before by the device.

Thus, the solution can easily determine the return destination of the valuable medium depending on the type of the command executed immediately before by the device.

The return destination of the valuable medium may comprise the user and the device.

Accordingly, the solution can determine the return destination of the valuable medium as the user or the administrator of the medium processing system.

The transaction may be a deposit, and the error recovery processing may comprise a process of determining the return destination of the valuable medium as the device when the deposit is accepted, and determining the return destination of the valuable medium as the user when the deposit is not accepted.

In the case where the transaction is the deposit, the device may determine that the valuable medium that is taken in through an inlet, whose denomination is recognized by the recognition unit, and that is stored in the storage unit is a valuable medium for which the transaction of the deposit is accepted, and determine that other valuable media are valuable media for which the transaction of the deposit is not accepted.

Accordingly, the solution can appropriately determine the return destination of the valuable medium when the transaction is the deposit.

The transaction may be a withdrawal, and the error recovery processing may comprise a process of determining the return destination of the valuable medium as the user when the withdrawal is accepted and determining the return destination of the valuable medium as the device when the withdrawal is not accepted.

When the transaction is the withdrawal, the device may determine that the valuable medium fed from the storage unit prior to an error occurrence and dispensed to an outlet is a valuable medium for which the transaction of the withdrawal is accepted, and determine that other valuable media are valuable media for which the transaction of the withdrawal is not accepted.

Accordingly, the solution can appropriately determine the return destination of the valuable medium when the transaction is the withdrawal.

The middleware may conform to a standard.

The first error information may be a message that does not conform to the standard.

Thus, even when the standard to which the middleware conforms does not have the function of handling the first error information, the solution makes it possible to perform effective error control.

The standard may be a standard of Extensions for Financial Systems.

Accordingly, even when the standard to which the middleware conforms is the standard of the Extensions for Financial Systems that does not have the function of handling the first error information, the solution makes it possible to perform effective error control.

The solution may further comprise a middleware execution unit that executes the middleware.

Accordingly, even when the solution comprises the middleware execution unit that executes middleware, error control can be effectively performed.

The solution may comprise the device.

Thus, even when the solution comprises the device, error control can be effectively performed.

The solution may acquire, via the middleware, second error information from among the pieces of information on the error. The second error information may be a message conforming to the standard. The second error information may comprise recognition information indicating the device in which an error has occurred.

The medium processing system, the medium processing method, and the recording medium according to the present disclosure are capable of effectively performing error control when an error occurs in a device.

FIG. 1 illustrates an exemplary external appearance of a medium processing system 100 according to the present embodiment as seen from the front. FIG. 1 illustrates front, rear, left, and right directions with respect to the medium processing system 100, and description will be given based on these directions in the present specification.

The medium processing system 100 is installed in various facilities including an establishment (financial establishment) of a financial institution such as a bank or a store (distribution store) such as a convenience store. The medium processing system 100 is an apparatus that performs various kinds of processing related to transactions for various kinds of valuable media.

Specific examples of the valuable media include banknotes, coins, and cheques. The coins comprises rolled coins and loose coins. The banknotes may comprise bound notes and loose notes. Specific examples of the transactions include a deposit, withdrawal, money change, and transfer.

The medium processing system 100 comprises a rolled coin device 2 that performs processing related to a transaction for rolled coins, a banknote device 3 that performs processing related to a transaction for loose notes, a loose coin device 4 that performs processing related to a transaction for loose coins, a cheque device 5 that performs processing related to a transaction for cheques, and a drop box 6 into which an envelope containing a valuable medium which is not recognized normally by the medium processing system 100 is put.

The rolled coin device 2, the banknote device 3, the loose coin device 4, the cheque device 5, and the drop box 6 are housed in the housing 1 in a row along the left-right direction.

In the example illustrated in FIG. 1, the rolled coin device 2, the banknote device 3, the cheque device 5, the loose coin device 4, and the drop box 6 are disposed in this order from right to left with reference to the medium processing system 100. Further, the medium processing system 100 may comprise a bound note device that performs processing related to a transaction for bound notes. The bound note device may be disposed between the rolled coin device 2 and the banknote device 3.

At least one of the inlet and outlet of each device is disposed in the front surface of the housing 1. The rolled coin device 2 includes an outlet 22 for dispensing the rolled coins. The outlet 22 is provided with a shutter 22S for opening and closing the outlet 22.

The banknote device 3 includes an inlet 31 for receiving banknotes and an outlet 32 for dispensing banknotes. The inlet 31 is provided with a shutter 31S for opening and closing the inlet 31, and the outlet 32 is provided with a shutter 32S for opening and closing the outlet 32.

The loose coin device 4 includes an inlet 41 for receiving the loose coins and an outlet 42 for dispensing the loose coins. The inlet 41 is provided with a shutter 41S for opening and closing the inlet 41, and the outlet 42 is provided with a shutter 42S for opening and closing the outlet 42.

The cheque device 5 includes an inlet 51 for receiving a cheque and an outlet 52 for dispensing a cheque. The inlet 51 is provided with a shutter 51S for opening and closing the inlet 51, and the outlet 52 is provided with a shutter 52S for opening and closing the outlet 52. Note that the outlet 52 may be an output port for returning a cheque input from the inlet 51.

Note that, although FIG. 1 illustrates the example in which the inlets and outlets are provided with the shutters, the inlets or outlets do not have to be provided with the shutters in the present disclosure.

In addition, the drop box 6 includes a receiving port 61 for receiving an input of an envelope containing a valuable medium which has not been normally recognized. The receiving port 61 may be provided with a shutter with a lock.

A front display FD and a pin pad PP are disposed on the front surface of the housing 1 as user interfaces of the medium processing system 100.

The front display FD has a structure (touch panel) in which a touch pad and a thin display are stacked on each other, and presents various types of display to the user and receives an input operation by the user.

The pin pad PP receives an input of a personal identification number (PIN) by the user. The pin pad PP is, for example, a numeric keypad. Note that the user means a person who performs a transaction using the medium processing system 100 and, for example, is a client who uses a facility in which the medium processing system 100 is installed.

In the embodiment illustrated in FIG. 1, the front display FD and the pin pad PP are disposed at a position corresponding to the banknote device 3 in the left-right direction.

For example, the front display FD is disposed on the upper side of the banknote device 3, and the pin pad PP is disposed adjacently to the inlet 31 or the outlet 32 of the banknote device 3. The front display FD and the pin pad PP are disposed at positions where the user easily operates the front display FD and the pin pad PP during use of the banknote device 3.

Further, a card reader CaR, a code reader CoR, a receipt printer RP, an A4 printer AP, a camera Cam, and an NFC reader NM are disposed on the front surface of the housing 1.

The card reader CaR reads, for example, a cash card of a bank account or a credit card. The code reader CoR reads a barcode, a two-dimensional code, or the like.

The receipt printer RP and A4 printer AP print information on a result of processing performed by the user using the medium processing system 100 and provide the information to the user.

The camera Cam captures an image of a face of the user who uses the medium processing system 100, an administrator of the medium processing system 100, or the like, and uses the image as part of history information on the processing. In addition, the camera Cam may be used to generate face image data used for face authentication of the user and/or the administrator.

The administrator of the medium processing system 100 is a person who manages the medium processing system 100 and the valuable medium, and is, for example, an employee of the facility in which the medium processing system 100 is installed.

The NFC reader NM performs communication with, for example, a mobile terminal (such as a smartphone or a tablet terminal) possessed by the user via a Near Field Communication (NFC).

Figure 2:
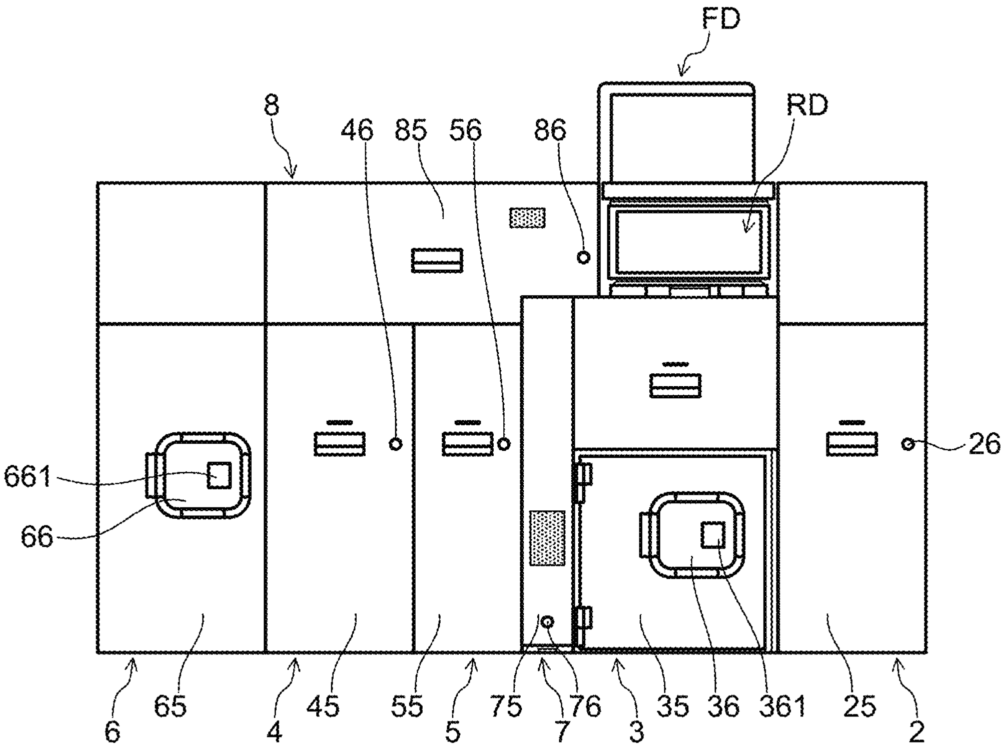
FIG. 2 illustrates the external appearance of the medium processing system as seen from the rear.

FIG. 2 illustrates an exemplary external appearance of the medium processing system 100 as seen from the rear. The rear surface of the housing 1 is provided with a door 25 of the rolled coin device 2, a door 35 of the banknote device 3, a door 45 of the loose coin device 4, a door 55 of the cheque device 5, and a door 65 of the drop box 6. These doors 25, 35, 45, 55, and 65 allow the administrator of the medium processing system 100 or the like to access the inside of each device.

Each of the doors 25, 35, 45, 55, and 65 can be locked by locks 26, 36, 46, 56, and 66, respectively. The banknote device 3 and the drop box 6 may include key input devices 361 and 661 for inputting a password for unlocking the locks 36 and 66, respectively.

In the example illustrated in FIG. 2, a controller box 7 is disposed between the banknote device 3 and the cheque device 5. The controller box 7 houses a controller corresponding to a below-described control unit 10. The controller box 7 includes a door 75 and a lock 76.

A peripheral device box (peripheral device box) 8 is disposed on the upper side of the banknote device 3, the loose coin device 4, and the cheque device 5.

The peripheral device box 8 houses a main bodies of the front display FD, pin pad PP, card reader CaR, code reader CoR, receipt printer RP, A4 printer AP, and camera Cam, NFC reader NM, and the like illustrated in FIG. 1. The peripheral device box 8 has a door 85 and a lock 86.

Further, a rear display RD is disposed on the rear surface of the housing 1 at the upper side of the banknote device 3. The rear display RD, like the front display FD, includes a touch panel in which a touch pad and a thin display are stacked on each other. The rear display RD is capable of presenting various types of display to the administrator and receiving an input operation by the administrator.

Figure 3:
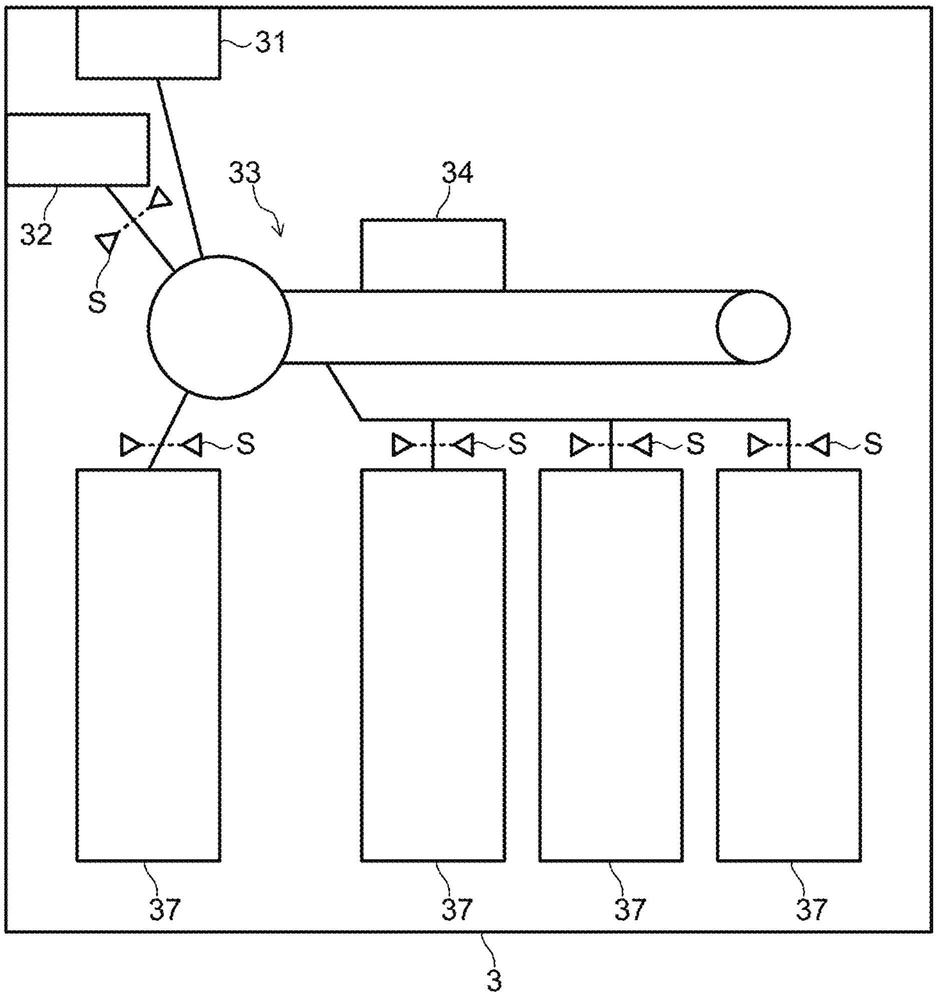
FIG. 3 illustrates an internal structure of a banknote device.

Next, an internal structure of the banknote device 3 will be described as an example of the internal structure of each device that the medium processing system 100 comprises. FIG. 3 illustrates an example of the internal structure of the banknote device 3. The banknote device 3 comprises a transport unit 33, a recognition unit 34, and storage units 37.

The transport unit 33 transports banknotes between the inlet 31, the outlet 32, and the storage units 37. The transport unit 33 comprises, for example, a belt and a roller. The banknotes fed from the inlet 31 are transported by the transport unit 33 to either the outlet 32 or the storage units 37.

The recognition unit 34 is disposed on a path of the transport unit 33 and near the inlet 31, and recognizes the denomination, the fitness, the authentication, and the like of the banknotes fed from the inlet 31.

Each of the storage units 37 stores banknotes. The storage unit 37 may comprise a recycle unit configured to be capable of feeding the banknotes once stored, and a collection unit configured to be incapable of feeding the banknotes once stored.

Further, the storage unit 37 may comprise a temporary storage unit that temporarily stores banknotes until the processing related to the transaction is completed, and that is capable of feeding the banknotes. Further, the storage units 37 may comprise a plurality of storages, and the storages for storing respective denominations may be determined in advance.

In addition, each part of the transport unit 33 is provided with a sensor S for detecting the presence or absence of a banknote. The banknote device 3 determines the position of the transported banknote by detecting an output signal of the sensor S.

For example, the banknote device 3 detects an output of the sensor S disposed at an entrance of the outlet 32 to determine whether or not the transported banknote has been dispensed to the outlet 32. Further, the banknote device 3 detects the output of the sensor S disposed at the entrance of the storage unit 37 to determine whether or not the transported banknote has been stored in the storage unit 37.

The other devices than the banknote device 3, namely the rolled coin device 2, the loose coin device 4, and the cheque device 5, have an internal structure the same as or similar to the banknote device 3 described above, or have a known internal structure. In addition, the internal structure of the drop box 6 is also a known internal structure. Specifically, the drop box 6 includes storage units that store an envelope input from the receiving port 61 illustrated in FIG. 1.

Thus, detailed description of the internal structures of the rolled coin device 2, the loose coin device 4, the cheque device 5, and the drop box 6 will be omitted.

Figure 4:
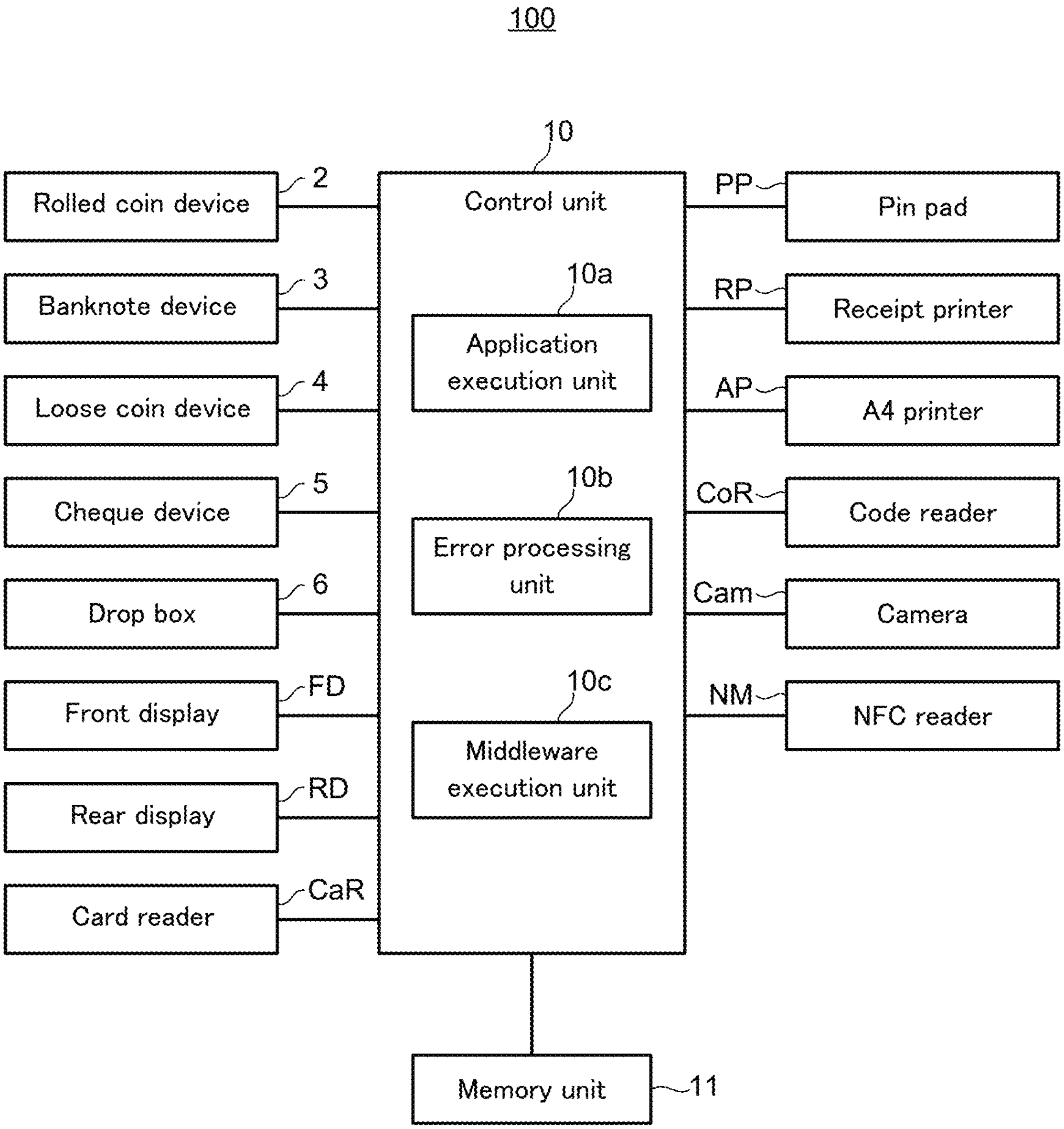
FIG. 4 is a block diagram illustrating a functional blocks of the medium processing system.

FIG. 4 is a block diagram illustrating an example of functional blocks of the medium processing system 100. The control unit 10 is a processor that controls each configuration of the medium processing system 100. A memory unit 11 is a memory apparatus such as a memory that records various data necessary for processing executed by the control unit 10, programs, and the like.

The control unit 10 comprises an application execution unit 10*a*, an error processing unit 10*b*, and a middleware execution unit 10*c*.

The application execution unit 10*a* exchanges transaction information via middleware with a device that performs a transaction of a valuable medium, to execute an application for performing information processing related to the transaction.

The device that performs the transaction of the valuable media includes devices such as the rolled coin device 2, the banknote device 3, the loose coin device 4, the cheque device 5, the drop box 6, and the card reader CaR.

Examples of the application that performs the information processing related to the transaction include an application developed by a bank or the like that operates the medium processing system 100. The application execution unit 10*a* also executes other applications.

When an error occurs in a device during the transaction of the valuable medium, the error processing unit 10*b* acquires first error information from among pieces of information related to the error without the middleware to perform error recovery processing based on the first error information. This process will be described in detail later.

The middleware execution unit 10*c* executes the middleware that governs the exchange of data between the application executed by the control unit 10 and firmware incorporated in the device.

Figure 5:
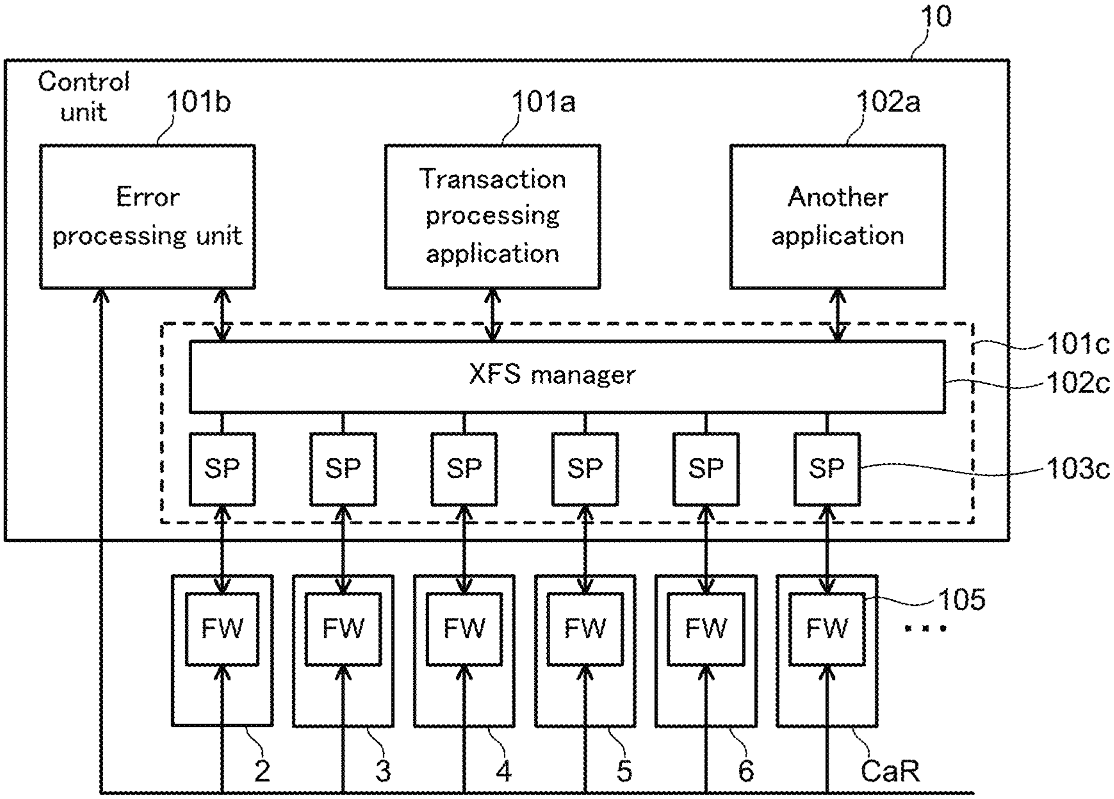
FIG. 5 illustrates a software configuration of the medium processing system as a computer.

FIG. 5 illustrates an example of a software configuration of the medium processing system 100 as a computer.

The software of the medium processing system 100 comprises: a transaction processing application 101*a* and another application 102*a* executed by the application execution unit 10*a* of the control unit 10; an error processing application 101*b* executed by the error processing unit 10*b*; firmware (FW) 105 that is software for controlling each device; and middleware 101*c* that governs data exchange between each application and the firmware incorporated in each device).

In the case of FIG. 5, the middleware 101*c* is middleware conforming to the standards of extensions for Financial Services (XFS) developed by the European Commission for Standardization. The middleware 101*c* comprises an XFS manager 102*c* and service providers 103*c*.

The XFS manager 102*c* executes an Application Programming Interface (API) for exchanging data between the applications and the service providers 103*c*. This data exchange is performed in a method that conforms to the XFS standards.

Each of the service providers 103*c* exchanges data with the XFS manager 102*c* in the method conforming to the XFS standards, and exchanges data with the firmware 105 in a method suitable to the specifications of the devices.

Even though the data exchange between each service provider 103*c* and the firmware 105 incorporated in each device depends on the specifications of a vendor providing the device, the applications and the XFS manager 102*c* are not affected by the difference in the specifications.

Figure 6:
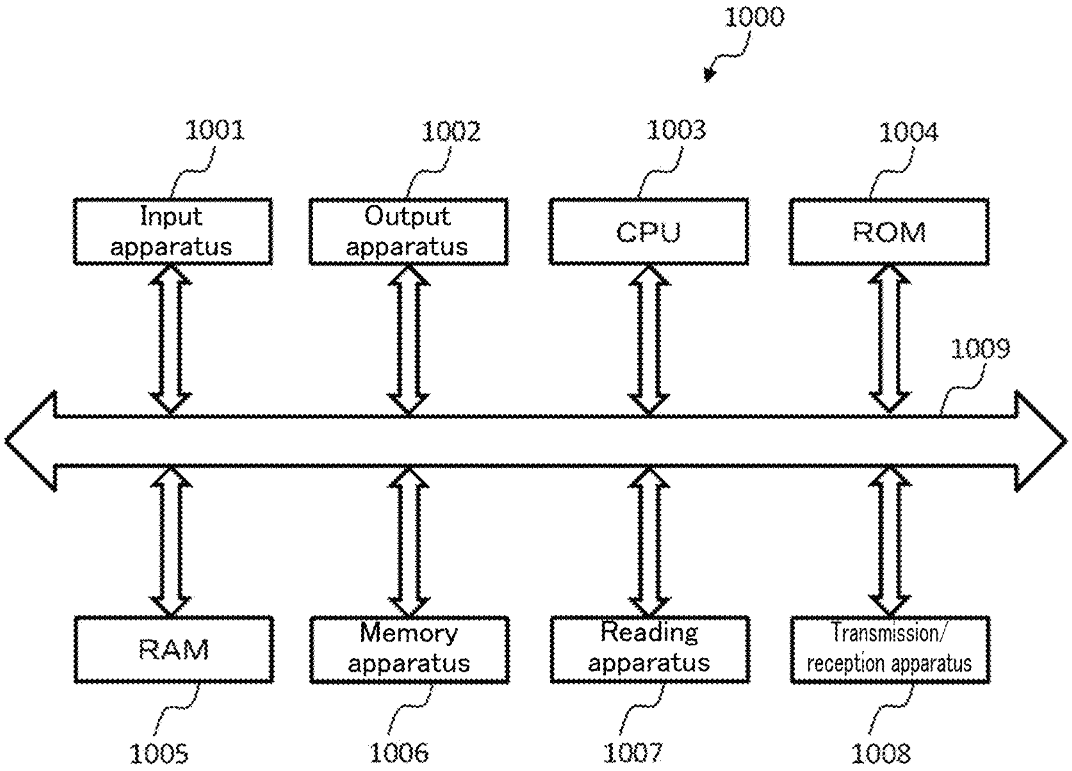
FIG. 6 illustrates a hardware configuration of the medium processing system as a computer.

FIG. 6 illustrates an exemplary hardware configuration of the medium processing system 100 as a computer.

The computer 1000 comprises an input apparatus 1001, an output apparatus 1002, a CPU 1003, a Read Only Memory (ROM) 1004, a Random Access Memory (RAM) 1005, a memory apparatus 1006, a reading apparatus 1007 that reads data from various recording media, and a transmission/reception apparatus 1008, which are connected to one another by a bus 1009.

The front display FD and the pin pad PP illustrated in FIG. 1 or the like, and the rear display RD illustrated in FIG. 2 or the like are examples of the input apparatus 1001. The front display FD and the rear display RD are examples of the output apparatus 1002. The memory unit 11 illustrated in FIG. 4 is an example of the memory apparatus 1006.

The reading apparatus 1007 reads programs for implementing functions of the apparatuses from the recording medium that records the programs, and records the programs on the memory apparatus 1006. Alternatively, the transmission/reception apparatus 1008 communicates with a system apparatus connected to a network, and records a program downloaded from the system apparatus on the memory apparatus 1006.

Then, the CPU 1003 copies the program recorded on the memory apparatus 1006 to the RAM 1005, and sequentially reads and executes the instructions included in the program from the RAM 1005. Accordingly, the functional blocks of the medium processing system 100 illustrated in FIG. 4 are operated.

Figure 7:
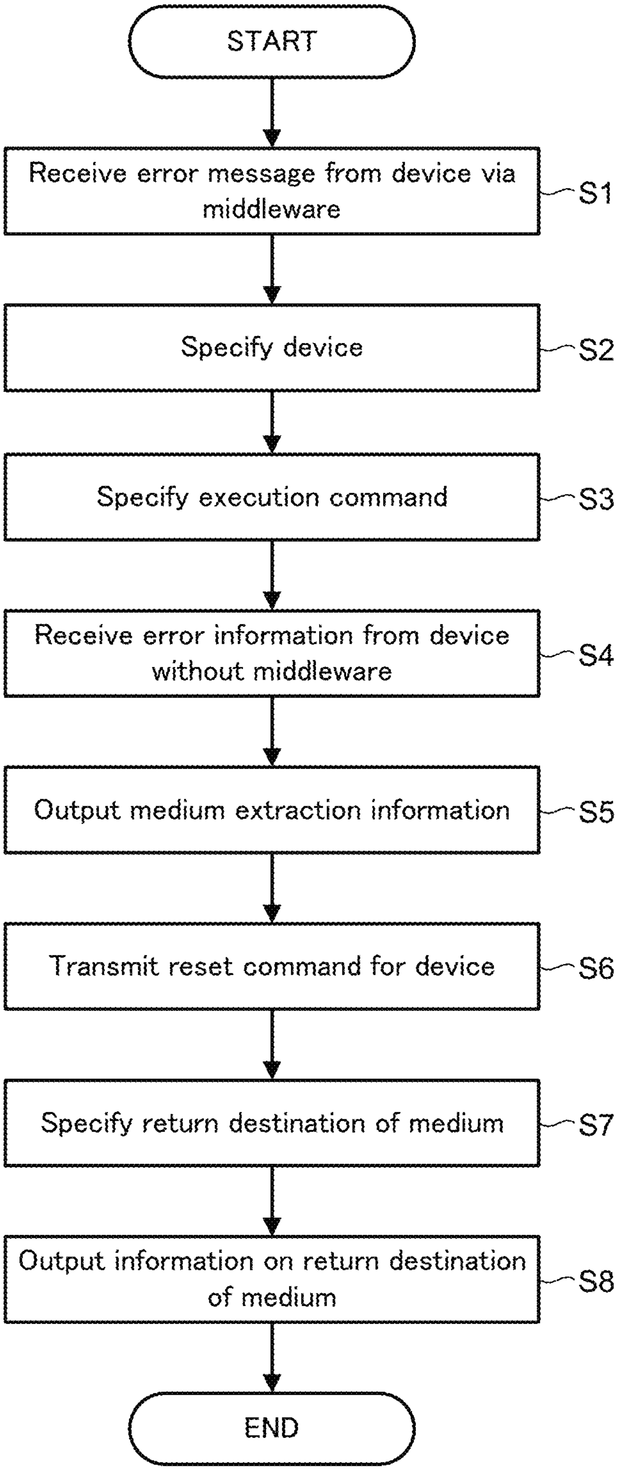
FIG. 7 is a flowchart illustrating error recovery processing performed by the medium processing system when an error occurs in a device.

Next, an operation example of medium processing performed by the medium processing system 100 will be described. FIG. 7 is a flowchart illustrating an example of error recovery processing performed by the medium processing system 100 when an error occurs in a device.

As the error occurring in the device, a description will be given below of the case of a stop of transport of a valuable medium and interruption of device operation caused by a clog of a valuable medium in the device, an occurrence of some failure, or the like. However, the error occurring is not limited thereto.

To begin with, the error processing unit 10*b* of the medium processing system 100 receives, via the middleware 101*c* from the device in which an error has occurred, an error message indicating that the error has occurred (step S1). This error message is second error information, which is a message conforming to the standards. The error message contains recognition information indicating the device in which the error has occurred.

Then, based on the error message, the error processing unit 10*b* recognizes the device in which the error has occurred (step S2). Further, the error processing unit 10*b* acquires, from the middleware 101*c*, the information about an execution command transmitted immediately before by the middleware 101*c* to the firmware 105, and specifies the processing which was being executed immediately before by the device in which the error occurred (step S3).

Note that while transmitting the error message to the error processing unit 10*b*, the device in which the error has occurred performs required processing on the error that has occurred, prior to the start of the error processing application 101*b*.

For example, the device in which the error has occurred performs discharge processing of stopping the transaction of the valuable medium and discharging, to the outlet 32, the valuable medium remaining in the transport unit 33.

In addition, the device generates the first error information and transmits the first error information to the error processing unit 10*b* without the middleware 101*c*. The first error information is a message that does not conform to the standards.

The first error information comprises information indicating the position of the valuable medium remaining in the transport unit 33 without having been discharged to the outlet 32 of the device in which the error has occurred, and information on the medium for which the transaction has been accepted. For example, in the case of the banknote device 3 described with reference to FIG. 3, the position of the valuable medium is detected by the sensor S. The information on the valuable medium for which the transaction has been accepted will be described in detail later.

Next, the error processing unit 10*b* receives, without the middleware 101*c*, the first error information transmitted by the device in which the error occurred (step S4).

Then, based on the information indicating the position of the valuable medium included in the first error information, the error processing unit 10*b* generates medium extraction information instructing extraction of the valuable medium remaining in the transport unit 33, and outputs the medium extraction information to the front display FD (step S5).

The error processing unit 10*b* may output the medium extraction information to the rear display RD or to both the front display FD and the rear display RD. In addition, the error processing unit 10*b* may be configured to transmit the medium extraction information to a mobile terminal possessed by the user or the administrator of the medium processing system 100.

Figure 8:
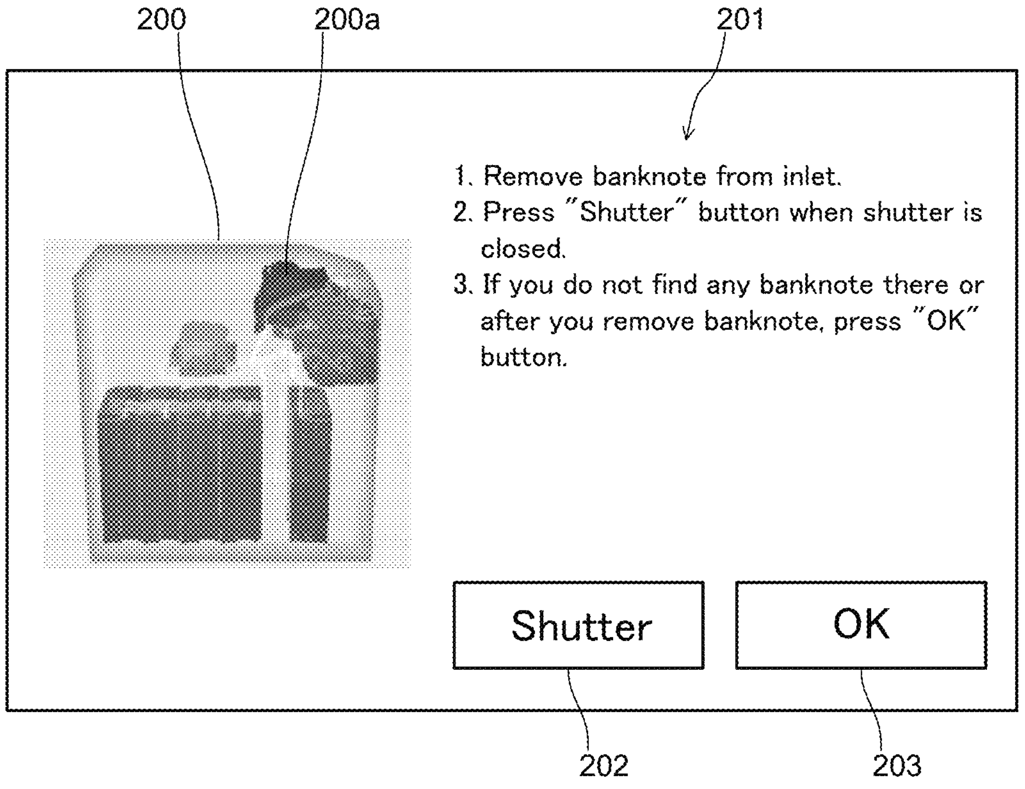
FIG. 8 illustrates medium extraction information that is output by the banknote device to a user.

FIG. 8 illustrates an example of the medium extraction information that the banknote device 3 outputs to the user. In the medium extraction information illustrated in FIG. 8, an image 200 indicating the position 200*a* in which the banknote remains, an instruction 201 for prompting the user to remove the banknote from the position 200*a*, a shutter button 202 for opening the shutter, and an OK button 203 to be pressed by the user when there is no banknote in the position 200*a* or after the user removes the banknote are displayed.

After the user presses the OK button 203, the error processing unit 10*b* transmits, via the middleware 101*c* to the device in which the error occurred, a command for resetting the device (step S6). This command conforms to the standards.

After successfully resetting the device in which the error occurred, the error processing unit 10*b* specifies the return destination of the valuable medium removed from the device, based on the information on the valuable medium for which the transaction has been accepted, which is included in the above-described first error information (step S7). Here, the valuable medium removed from the inside of the device is the valuable medium discharged to the outlet 32 and the valuable medium removed from the position 200*a*.

FIG. 9 illustrates an example of a determination rule for determining the return destination. As illustrated in FIG. 9, in a case where processing executed immediately before by the device is the deposit processing and the transaction of the deposit has been accepted, the return destination of the valuable medium is the device. In this case, the valuable medium removed from the inside of the device is input through the inlet 31 and stored in the device.

In a case where the processing executed immediately before by the device is the deposit processing and the transaction of the deposit has not been accepted, the return destination of the valuable medium is the user. In this case, the valuable medium removed from the device is returned to the user.

When the processing executed immediately before by the device is the withdrawal processing and the transaction of the withdrawal has been accepted, the return destination of the valuable medium is the user. In this case, the valuable media removed from the inside of the device is passed to the user.

In a case where the processing executed immediately before by the device is the withdrawal processing and the transaction of the withdrawal has not been accepted, the return destination of the valuable medium is the device. In this case, the valuable medium removed from the inside of the device is input through the inlet 31 and stored in the device.

The device in which the error has occurred determines whether or not the transaction has been accepted, for example, in the following manner.

In the case of the deposit processing, the device determines that the valuable medium that has been taken in through the inlet 31, whose denomination has been recognized by the recognition unit 34, and that has been stored in the storage unit 37 is the valuable medium for which the transaction of the deposit has been accepted, and determines that other valuable media are valuable media for which the transaction of the deposit has not been accepted.

In particular, regarding the medium clogged at the entrance of the storage unit 37, the device detects, based on the outputs of the sensors S, whether or not the valuable medium has been stored in the storage unit 37, and determines whether or not the deposit transaction has been accepted.

In the case of the withdrawal processing, the device determines that the valuable medium fed from the storage unit 37 prior to the error occurrence and dispensed to the outlet 32 is a valuable medium for which the transaction of the withdrawal has been accepted, and determines that other valuable media are valuable media for which the transaction of the withdrawal has not been accepted.

In particular, for the medium clogged at the entrance of the outlet 32, the device detects, based on the outputs of the sensors S, whether or not the medium has been dispensed to the outlet 32, and determines whether or not the transaction of the withdrawal has been accepted.

With regard to the deposit transaction, after all the valuable media put in the inlet 31 by the user are stored in the storage unit 37, the device may determine the valuable media as the valuable media for which the deposit transaction has been accepted, and determine other valuable media as the valuable media for which the deposit transaction has not been accepted.

Further, after all the valuable media put in the inlet 31 by the user are stored in the storage unit 37 and the user presses the OK button displayed on the front display FD, the device may determine the valuable media as valuable media for which the deposit transaction has been accepted, and determine other valuable media as valuable media for which the deposit transaction has not been accepted.

In addition, with regard to the withdrawal transaction, after all the valuable media are dispensed to the outlet 32 and the user presses the shutter button displayed on the front display FD to open the shutter, the device may determine the valuable media as valuable media for which the withdrawal transaction has been accepted, and determine other valuable media as valuable media for which the withdrawal transaction has not been accepted.

After specifying the return destination of the valuable medium, the error processing unit 10*b* outputs, to the front display FD, the return destination information indicating the return destination of the valuable medium removed from the device (step S8).

The error processing unit 10*b* may output the return destination information to the rear display RD or may output the return destination information to both the front display FD and the rear display RD. In addition, the error processing unit 10*b* may be configured to transmit the return destination information to the mobile terminal possessed by the user or the administrator of the medium processing system 100.

Figure 10:
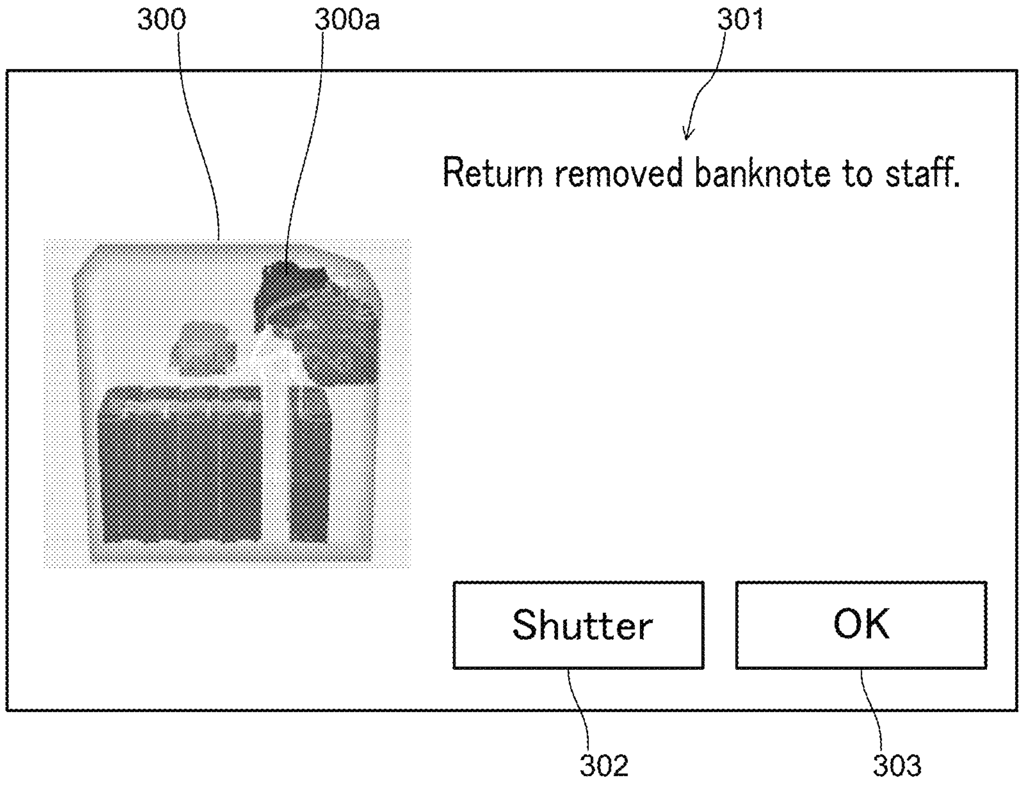
FIG. 10 illustrates return destination information that is output by the banknote device to the user.

FIG. 10 illustrates an example of the return destination information that the banknote device 3 outputs to the user. In the return destination information illustrated in FIG. 10, an image 300 indicating the position 300*a* at which the banknote remained, an instruction 301 prompting the user to return the removed banknote to the administrator of the medium processing system 100, a shutter button 302 for opening the shutter, and an OK button 303 to be pressed by the user after the user confirms the content of the instruction 301 are displayed. At this timing, the shutter button 302 is grayed out so as not to be pressed.

When the banknote removed is returned by the user, the administrator of the medium processing system 100 put the banknote in the inlet 31 and stores the banknote in the device.

Figure 11:
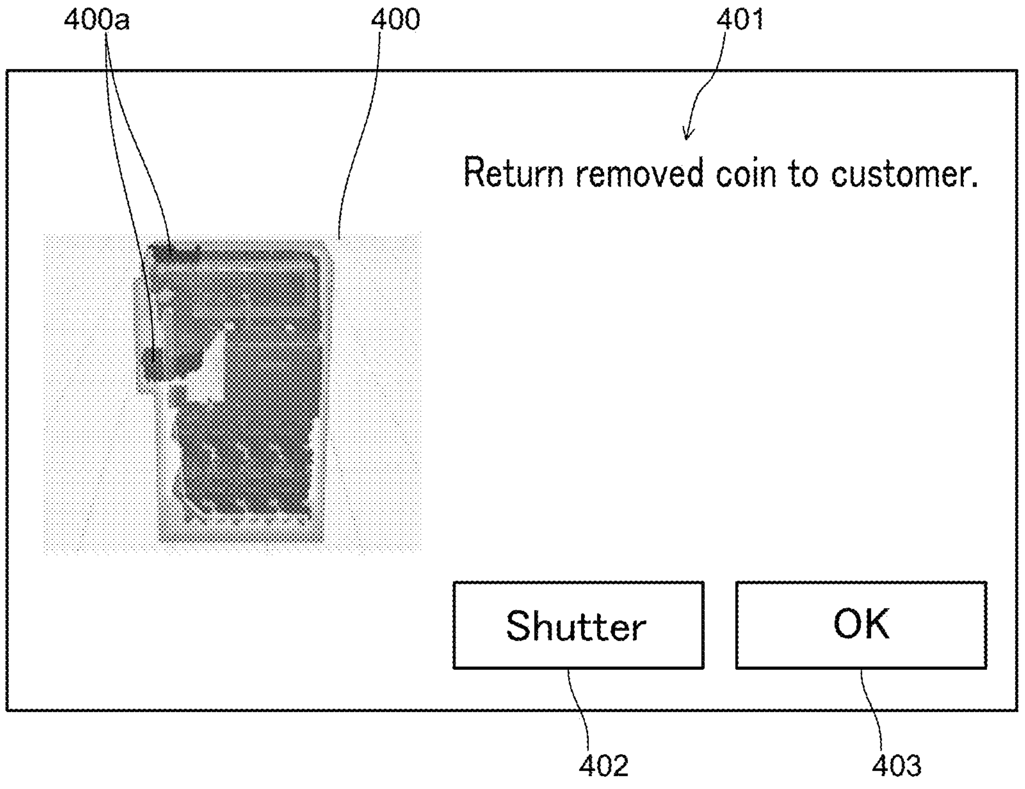
FIG. 11 illustrates return destination information output by a loose coin device to an administrator of the medium processing system.

FIG. 11 illustrates an example of the return destination information output by the loose coin device 4 to the administrator of the medium processing system 100. In the return destination information illustrated in FIG. 11, an image 400 indicating the position 400*a* in which a coin remained, an instruction 401 prompting the administrator of the medium processing system 100 to return the removed coin to the user, a shutter button 402 for opening the shutter, and an OK button 403 to be pressed by the administrator of the medium processing system 100 confirming the content of the instruction 401 are displayed. At this timing, the shutter button 302 is grayed out so as not to be pressed.

The return destination information for the administrator as illustrated in FIG. 11 is output when the valuable medium remains at a position accessible for removal only by the administrator of the medium processing system 100.

In addition, as described above, when an error occurs, the device performs the discharge processing of discharging the valuable medium remaining in the device to the outlet 32. Therefore, in the case of the withdrawal transaction, the valuable medium which is normally dispensed prior to the error occurrence and the valuable medium which is discharged in the discharge processing are mixed together at the outlet 32.

In this case, since the device holds information on the denominations and the numbers of the valuable media for which the withdrawal transaction has been accepted, the application execution unit 10*a* acquires, from the device through the middleware 101*c*, the denominations and the numbers of the valuable media for which the withdrawal transaction has been accepted. Then, the application execution unit 10*a* causes the receipt printer RP to print the information as a withdrawal receipt.

By looking at the withdrawal receipt, the user can easily grasp the denominations and the numbers of the valuable media that the user can take and the denominations and the numbers of the valuable media to be returned to the administrator of the medium processing system 100.

In addition, the error processing unit 10*b* may sort the valuable media for which the withdrawal transaction has been accepted and the valuable media for which the withdrawal transaction has not been accepted, and may output, to the front display FD, information prompting the administrator of the medium processing system 100 to return the valuable media for which the withdrawal transaction has not been accepted.

The error processing unit 10*b* may output the information to the rear display RD or may output the information to both the front display FD and the rear display RD. In addition, the error processing unit 10*b* may be configured to transmit the information to the mobile terminal possessed by the user or the administrator of the medium processing system 100.

Further, in the above-described embodiment, as described with reference to FIG. 4, the application execution unit 10*a*, the error processing unit 10*b*, and the middleware execution unit 10*c* are disposed in the control unit 10 housed together with the devices in the housing 1, but all or a part of them may be disposed in another apparatus such as a cloud server apparatus installed separately from the devices. In this case, the other device is also comprised in the medium processing system in the claims.

In the software configuration illustrated in FIG. 5, all or a part of the transaction processing application 101*a*, another application 102*a*, the error processing application 101*b*, the XFS manager 102*c*, and the service providers 103*c* may be installed in another apparatus such as a cloud server apparatus installed separately from the devices. The other apparatus in this case is also comprised in the medium processing system in the claims.

As described above, the medium processing system 100 comprises the application execution unit 10*a* that exchanges transaction information via the middleware 101*c* with a device that performs a transaction of a valuable medium, to perform information processing on the transaction, and the error processing unit 10*b* that, upon occurrence of an error in the device during the transaction of the valuable medium, acquires the first error information from among pieces of information on the error without the middleware 101*c* to perform error recovery processing based on the first error information.

Accordingly, even when the middleware 101*c* does not have the function of handling the first error information, the medium processing system 100 is capable of effectively performing error control.

In addition, the transaction of the valuable medium involves transport processing of the valuable medium, and the error recovery processing comprises a process of determining the return destination of the valuable medium transported.

Accordingly, even when the middleware 101*c* does not have the function of handling the first error information, the medium processing system 100 is capable of determining the return destination of the valuable medium.

In addition, the first error information comprises information on the position of the valuable medium transported.

Accordingly, the medium processing system 100 is capable of easily detecting the position of the valuable medium remaining in the device, and effectively performing the error recovery processing.

In addition, the error processing unit 10*b* outputs, based on the information on the position of the valuable medium, information for prompting extraction of the valuable medium from the device.

This allows the medium processing system 100 to effectively prompt the user or the administrator of the medium processing system 100 to extract the valuable media from the device.

In addition, the first error information comprises information on whether or not the transaction has been accepted.

Accordingly, the medium processing system 100 is capable of easily determining the return destination of the valuable medium depending on whether or not the transaction has been accepted.

In addition, the error processing unit 10*b* determines the return destination of the valuable medium based on the information on the command executed immediately before by the device.

Thus, the medium processing system 100 is capable of easily determining the return destination of the valuable medium depending on the type of the command executed immediately before by the device.

Further, the return destination of the valuable medium comprises the user and the device.

Accordingly, the medium processing system 100 is capable of determining the return destination of the valuable medium as the user or the administrator of the medium processing system 100.

Further, the transaction is a deposit, and the error processing unit 10*b* determines the return destination of the valuable medium as the device when the deposit is accepted, and determines the return destination of the valuable medium as the user when the deposit is not accepted.

Accordingly, the medium processing system 100 is capable of appropriately determining the return destination of the valuable medium when the transaction is a deposit.

Further, the transaction is a withdrawal, and the error processing unit 10*b* determines the return destination of the valuable medium as the user when the withdrawal is accepted, and determines the return destination of the valuable medium as the device when the withdrawal is not accepted.

Accordingly, the medium processing system 100 is capable of appropriately determining the return destination of the valuable medium when the transaction is a withdrawal.

The middleware 101*c* conforms to the standards.

Accordingly, even when the standards to which the middleware 101*c* conforms do not have the function of handling the first error information, the medium processing system 100 is capable of effectively performing the error control.

In addition, the above standards are the standards of Extensions for Financial Systems.

Accordingly, even when the standards to which the middleware 101*c* conforms are the standards of the Extensions for Financial Systems that do not have the function of handling the first error information, the medium processing system 100 is capable of effectively performing the error control.

The medium processing system 100 further comprises the middleware execution unit 10*c* that executes the middleware 101*c*.

Thus, even when the medium processing system 100 comprises the middleware execution unit 10*c* that executes the middleware 101*c*, it is possible to effectively perform error control.

The medium processing system 100 also comprises the above-described device.

Accordingly, even when the medium processing system 100 comprises the above-described device, error control can be effectively performed.

The present disclosure is not limited to the above-described embodiments, and various modifications can be made without departing from the gist of the present disclosure. In particular, the embodiments and variations described herein can be combined as desired.

The invention claimed is:

1. A medium processing system, comprising:
a memory; and
a processor, wherein
the processor is configured to:
execute an application for exchanging transaction information with a device via middleware to perform information processing on a transaction of a valuable medium, the device being configured to perform the transaction;
acquire, upon occurrence of an error in the device during the transaction, first error information from among pieces of information on the error without the middleware and information on a command executed immediately before by the device from the middleware; and
perform error recovery processing on the error based on the first error information and the information on the command,
wherein the transaction of the valuable medium involves transport processing for transporting the valuable medium, and
wherein the error recovery processing comprises a process of determining a return destination of the transported valuable medium.

2. The medium processing system according to claim 1, wherein
the first error information comprises information on a position of the transported valuable medium.

3. The medium processing system according to claim 2, wherein in the error recovery processing, the processor is configured to output information for prompting extraction of the transported valuable medium from the device based on the information on the position of the transported valuable medium.

4. The medium processing system according to claim 1, wherein the first error information comprises information indicating whether or not the transaction has been accepted.

5. The medium processing system according to claim 1, wherein the return destination of the transported valuable medium is either a user or the device.

6. The medium processing system according to claim 5, wherein:

the transaction is a deposit, and in the error recovery processing, the processor is configured to determine the return destination of the transported valuable medium as the device when the deposit is accepted, and determine the return destination of the transported valuable medium as the user when the deposit is not accepted.

7. The medium processing system according to claim 5, wherein:

the transaction is a withdrawal, and in the error recovery processing, the processor is configured to determine the return destination of the transported valuable medium as the user when the withdrawal is accepted, and determine the return destination of the transported valuable medium as the device when the withdrawal is not accepted.

8. The medium processing system according to claim 1, wherein the middleware conforms to a standard.

9. The medium processing system according to claim 8, wherein the standard is a standard of Extensions for Financial Services.

10. The medium processing system according to claim 1, wherein the processor is further configured to execute the middleware.

11. The medium processing system according to claim 1, further comprising:

the device.

12. The medium processing system according to claim 1, wherein when the transaction is a deposit transaction, the error recovery processing comprises a process of:

determining whether the transaction of the deposit has been accepted for the valuable medium whose denomination has been recognized during the deposit transaction;

determining that the return destination of the transported valuable medium for which the transaction has been accepted is the device; and determining that the return destination of the transported valuable medium other than the valuable medium for which the transaction has been accepted is a user.

13. A medium processing method executed by a processor, the method comprising:

exchanging transaction information with a device via middleware to perform information processing on a transaction of a valuable medium, the device being configured to perform the transaction;

acquiring, upon occurrence of an error in the device during the transaction, first error information from among pieces of information on the error without the middleware and information on a command executed immediately before by the device from the middleware; and performing error recovery processing on the error based on the first error information and the information on the command, wherein the transaction of the valuable medium involves transport processing for transporting the valuable medium, and wherein the error recovery processing comprises a process of determining a return destination of the transported valuable medium.

14. A non-transitory computer-readable recording medium recording thereon a medium processing program for causing a computer to execute:

exchanging transaction information with a device via middleware to perform information processing on a transaction of a valuable medium, the device being configured to perform the transaction;

acquiring, upon occurrence of an error in the device during the transaction, first error information from among pieces of information on the error without the middleware and information on a command executed immediately before by the device from the middleware; and performing error recovery processing on the error based on the first error information and the information on the command, wherein the transaction of the valuable medium involves transport processing for transporting the valuable medium, and wherein the error recovery processing comprises a process of determining a return destination of the transported valuable medium.

* * * * *